United States Patent [19]

Frank

[11] Patent Number: 5,024,862
[45] Date of Patent: Jun. 18, 1991

[54] AUTOMATED CUTTING AND KITTING SYSTEM OF COMPOSITE MATERIAL AND METHOD

[75] Inventor: Ed Frank, Aston, Pa.

[73] Assignee: The Boeing Company, Seattle, Wash.

[21] Appl. No.: 587,604

[22] Filed: Sep. 19, 1990

Related U.S. Application Data

[63] Continuation of Ser. No. 252,488, Sep. 30, 1988, abandoned.

[51] Int. Cl.$^5$ .......................... B05D 1/02; B05D 3/12; B05B 3/18; B05C 11/00
[52] U.S. Cl. .................................... 427/264; 427/289; 427/290; 118/39; 118/323; 118/697; 156/512
[58] Field of Search ............... 427/290, 291, 293, 275, 427/264; 118/39, 697, 323; 156/511, 512, 516, 517; 242/56 R

[56] References Cited

U.S. PATENT DOCUMENTS

| | | | |
|---|---|---|---|
| 3,932,923 | 1/1976 | DiMatteo | 156/512 X |
| 4,708,761 | 11/1987 | Taniguchi et al. | 156/516 |
| 4,752,352 | 6/1988 | Feygin | 156/512 X |

*Primary Examiner*—Evan Lawrence
*Attorney, Agent, or Firm*—Jones, Tullar & Cooper

[57] ABSTRACT

An automated cutting and kitting system for preimpregnated composite material and method by which a layup of a plurality of plies of at least two types of preimpregnated composite material is cut and stored. Each ply of a given type of preimpregnated composite material is aligned in the order in which it is positioned in the layup, cut in accordance with a predetermined shape and stored such that the top ply in the layup is stored first. The different types of preimpregnated composite material are supported on a supply which is indexed to present the particular type of material required by the layup.

13 Claims, 9 Drawing Sheets

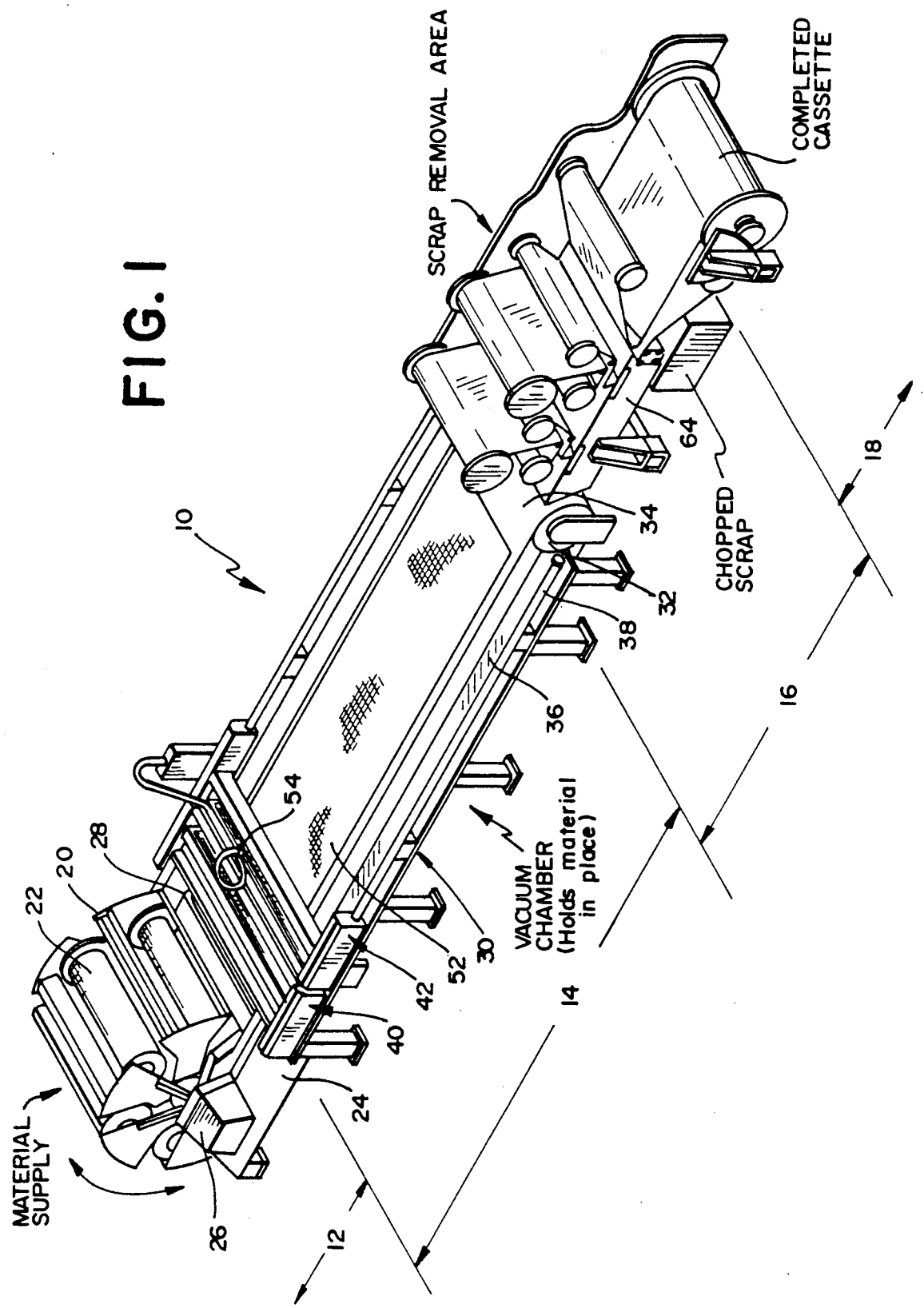

AUTOMATED CUTTING AND KITTING SYSTEM OF COMPOSITE MATERIAL AND METHOD

This is a continuation of co-pending application Ser. No. 07/252,488 filed on Sept. 30, 1988, now abandoned.

FIELD OF THE INVENTION

The present invention relates to the cutting and kitting of preimpregnated composite material, and in particular for the cutting and kitting of different types of preimpregnated composite material, and to a method of cutting and kitting the individual plies of a layup.

BACKGROUND OF THE INVENTION

In the fabrication of structural parts made of preimpregnated composite material, the material is assembled into a layup of plies (laminate), i.e., layers of the material, to the desired thickness, with each ply having the shape of the desired structural part, or another generalized shape which can be modified in a tool to the desired shape of the structural part. In either case, the layup is then cured in a tool to form the structural part.

A typical layup of preimpregnated composite material may include several types of preimpregnated composite material and any number of plies. For example, a layup comprising ten plies formed of the types of material noted below will be considered for discussion:

| Ply | Material Type |
| --- | --- |
| 1 | bias-Ply |
| 2 | uni |
| 3 | uni |
| 4 | woven |
| 5 | woven |
| 6 | bias-Ply |
| 7 | bias-Ply |
| 8 | uni |
| 9 | uni |
| 10 | woven |

The various material types are well known in the art. The bias-ply designation indicates that at least some of the filaments in the resin matrix are directed at any angle to the longitudinal axis of the material; the uni designation indicates that all the filaments in the resin matrix are directed parallel to each other and in the direction of the longitudinal axis of the material; and the woven designation indicates a combination of uni and 90° bias filaments in the resin matrix. Other types of preimpregnated materials are available. However, the discussion here will be confined to the three noted types.

A ten ply layup then includes ply 1 as its top layer and ply 10 as its bottom layer. The formation of such a layup can be very labor intensive and consequently quite costly. For this reason, attempts at automation have been made. One attempt utilizes a Gerber cutting system with which a large number of plies can be cut and shaped. Still, the cutting, picking and kitting of preimpregnated composite material, especially of more than one thickness, on a Gerber cutting system continues to be a major production restraint, and continues to be relatively labor intensive. Several of the problem areas result from the heat generated by the reciprocating knife which fuses the edges of the plies together thereby preventing individual ply separation, and the provision of individual plies of various styles/types of materials which cannot be accomplished without an excessive machine loading and unloading time.

It would therefore be desirable to have an autonomous cutting, picking and kitting system and method which will produce a complete layup when needed with the plies arranged in proper sequence, i.e., in view of the example above, with bias-ply, uni, uni, woven, woven, bias-ply, bias-ply, uni, uni and woven plies.

SUMMARY OF THE INVENTION

Such a system and method now exists which produces a laminate kit in, for example, cassette form. The laminate kit, with all the plies of a given layup are thus assembled and readily transportable, to the location of a laminating tool, where the plies are transferred to the tool for final curing of the laminate into a structural part.

For this purpose, the system proposed includes a supply which contains each type of preimpregnated composite material needed for a layup. The individual plies of different types are withdrawn from the appropriate supply and aligned in a row. The aligned plies are then shaped in accordance with a preselected outline and thereafter stored in the order in which they are to be positioned in the layup, i.e., the top ply is stored first.

The supply and shaping mechanisms as well as other functions of the system are preferably controlled by numerical control equipment which is known and therefore does not form a part of this invention.

BRIEF DESCRIPTION OF THE DRAWINGS

Six figures have been selected to illustrate a preferred embodiment of the present invention, with FIG. 2 comprising parts 2a-2f. All of the figures are schematic in nature. While schematic, these figures are sufficient when taken together with the written description to enable a person skilled in the art to practice the invention. Included are:

FIG. 1, which is a schematic view in perspective of the automated cutting and kitting system according to a preferred embodiment of the present invention;

DESCRIPTION OF THE PREFERRED EMBODIMENTS

Figure 2A:
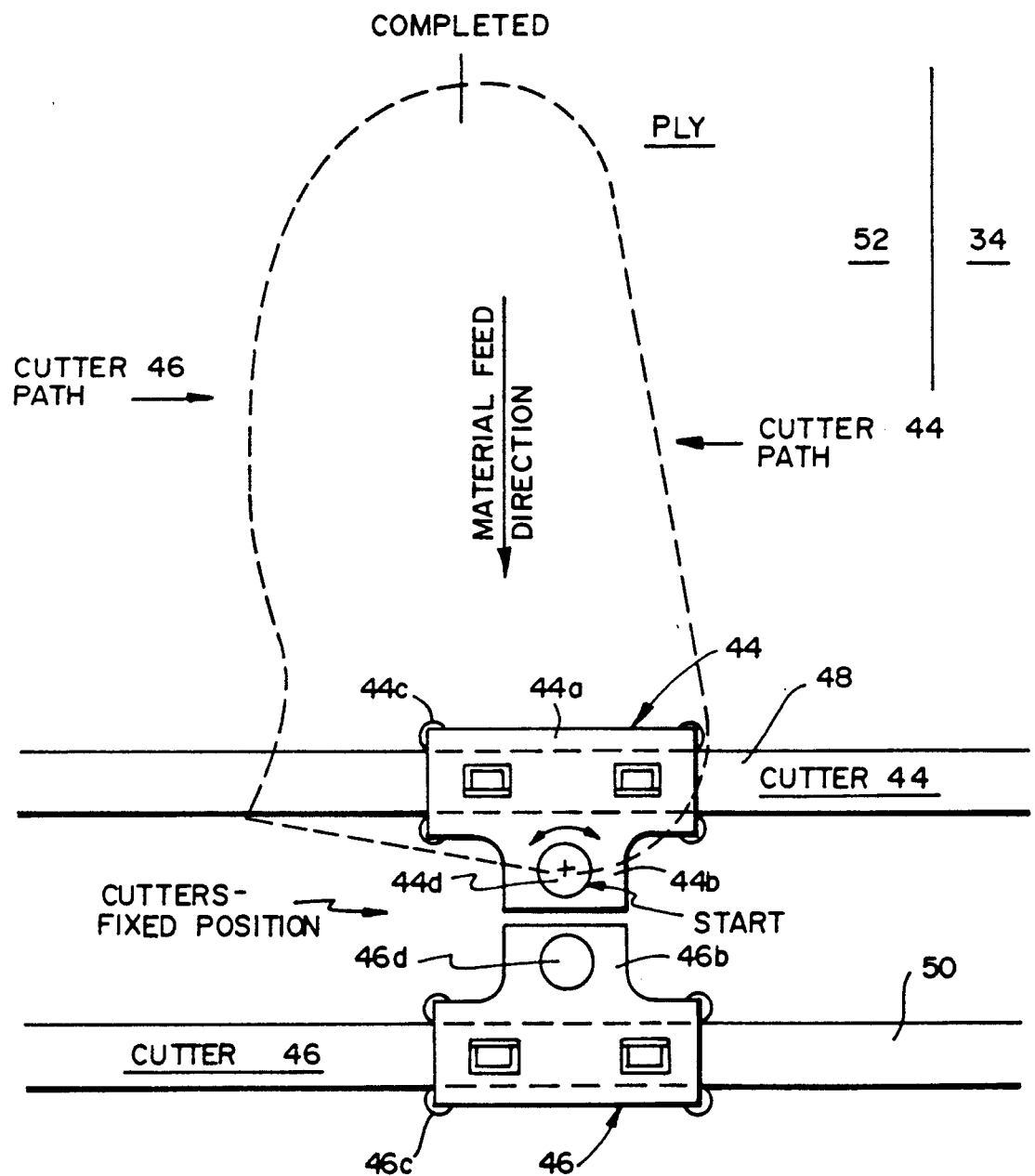
FIGS. 2a-2f, which are schematic illustrations of the cutters employed to shape the cut plies to their predetermined shape, the various views illustrate a complete cycle of operation resulting in a shaped ply.
Figure 2B:
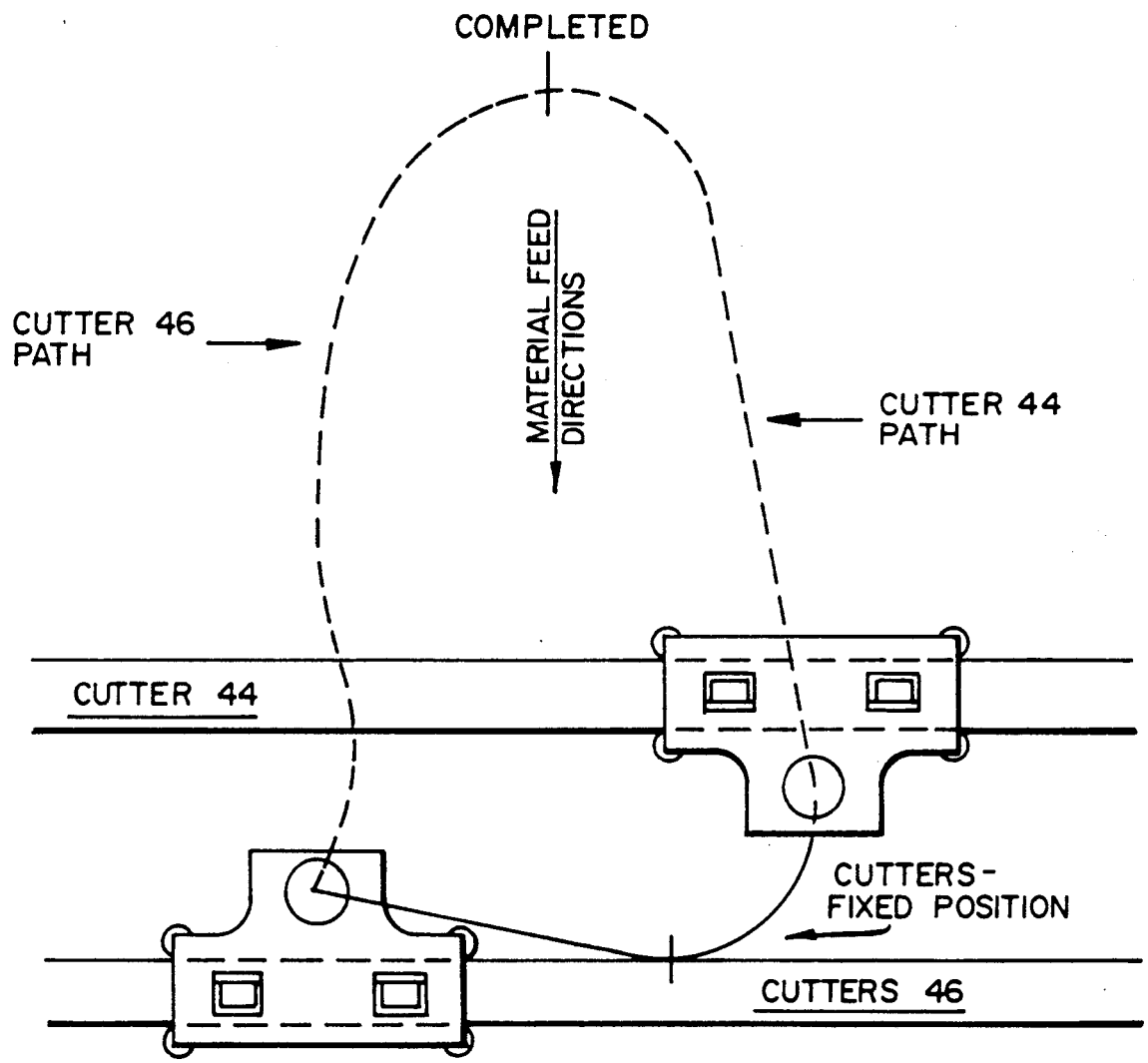
Figure 2C:
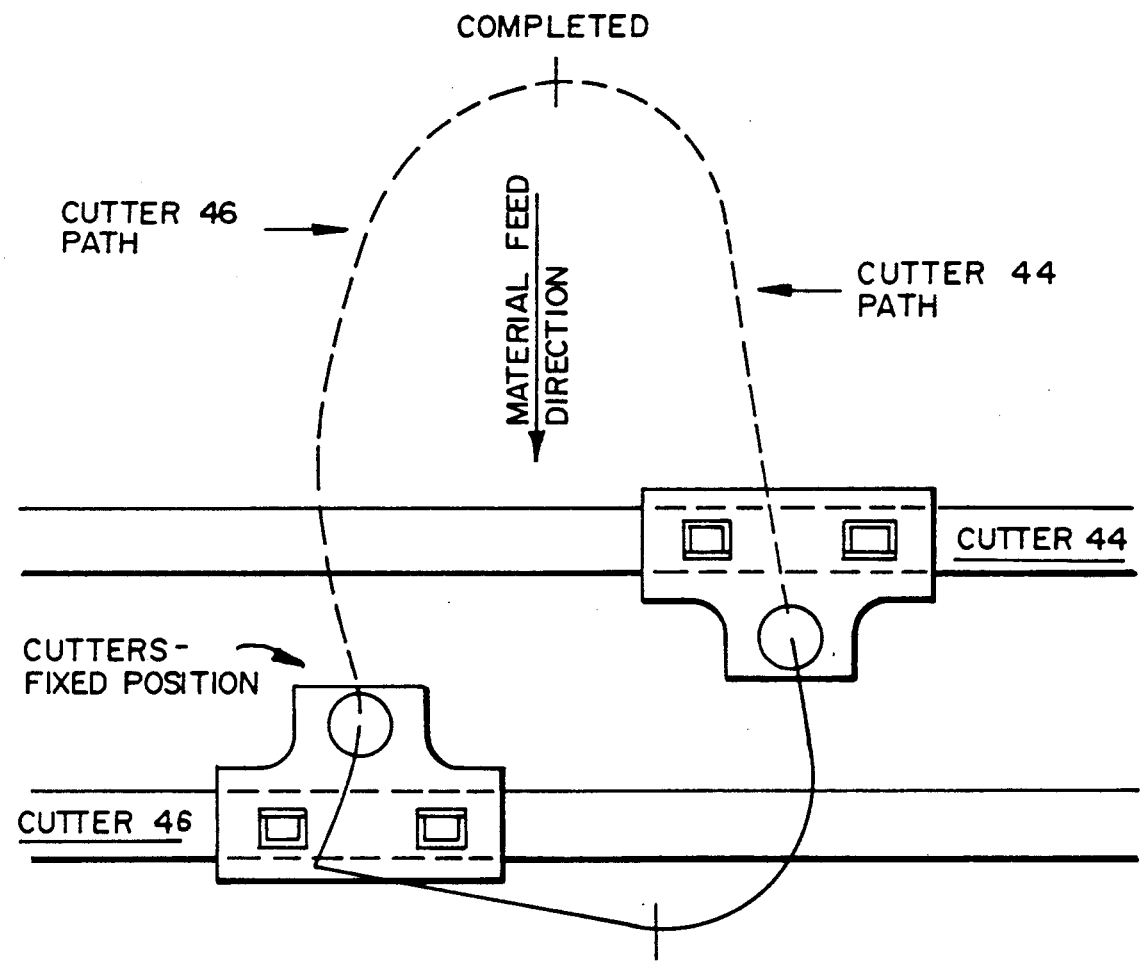
Figure 2D:
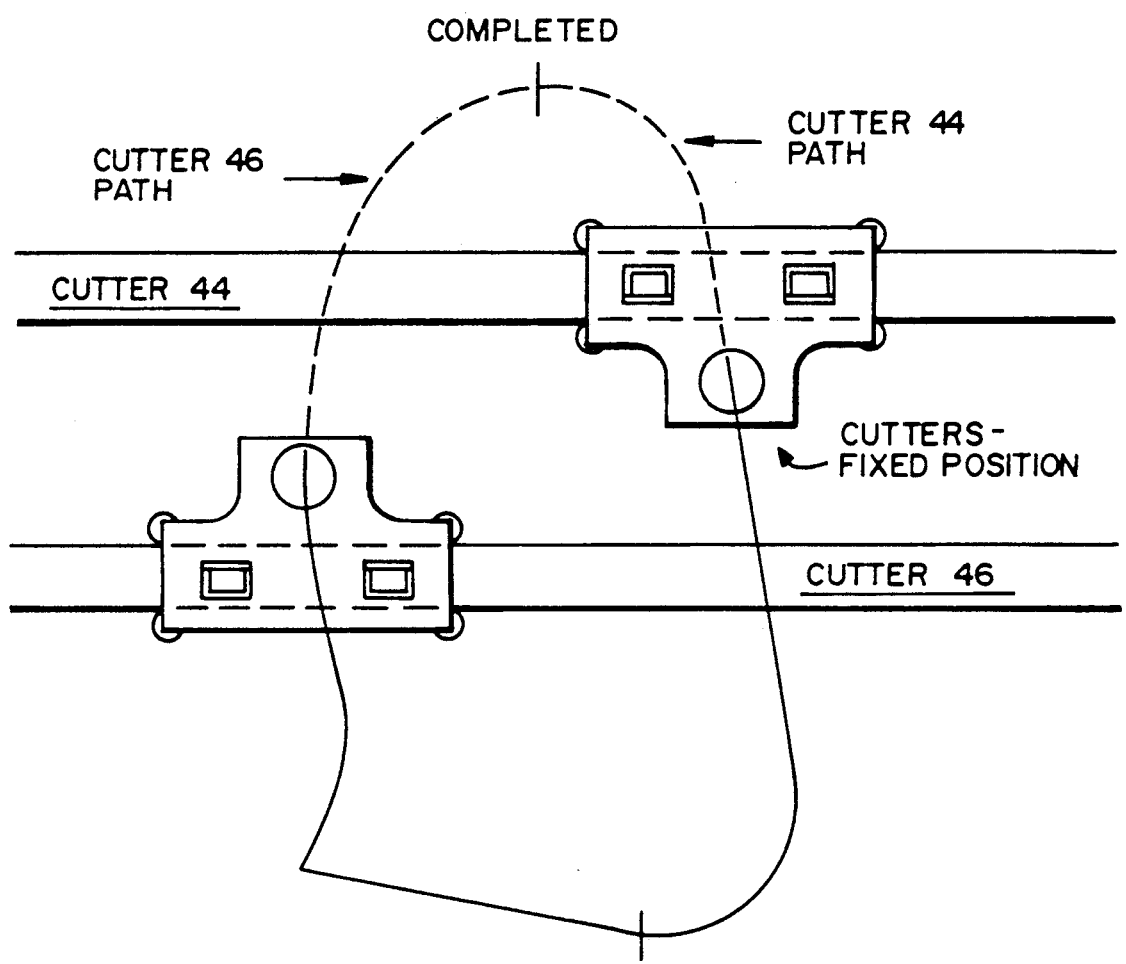
Figure 2E:
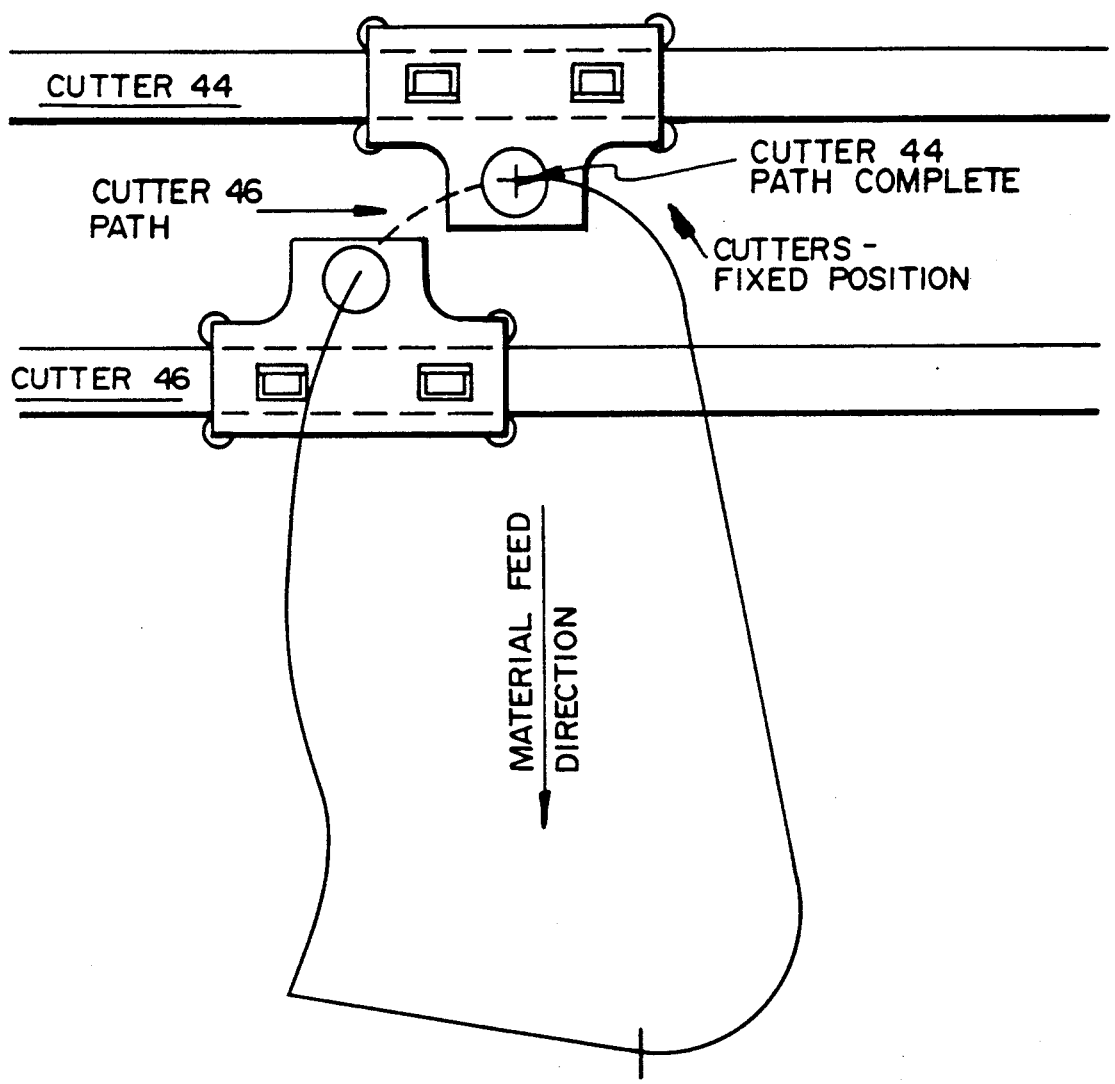

A preferred version of the system according to the present invention is shown at 10 in FIG. 1. The system 10 includes a supply station 12, a working station 14, a scrap removal station 16 and a storing station 18.

The supply station 12 includes a revolving material supply barrel or chamber 20 designed to accommodate as many types of preimpregnated composite material rolls 22 as desired. For example, the chamber 20 shown in FIGS. 1 and 5 accommodates six types of material. The chamber 20 is mounted on a frame 24 on which is mounted an indexing mechanism 26 connected to rotate the chamber 20 through a given angle depending on the number of rolls 22 included in the chamber 20. A pair of draw-off rollers and a knife are housed in housing 28. Neither the draw-off rollers nor the knife are otherwise shown. The control for operating the draw-off rollers and knife is also not shown. Both the indexing mechanism 26 and the control for operating the draw-off rollers and knife are numerically controlled as noted above. The knife has a cutting edge which has an extent at least equal to the width of the material on the rolls.

The working station 14 includes an elongated conveyor table 30 on which a pair of spaced conveyor rollers 32 are mounted for conveying an endless belt 34. The belt 34 travels over a platform 36 which defines a vacuum chamber. The vacuum in the vacuum chamber is communicated to the underside of the belt 34. Preferably mounted to the platform 36 on each longitudinal side thereof are rails 38 on which shaping gantry 40 and marking gantry 42 are mounted for displacement along the rails as indicated by the double arrows in FIGS. 1 and 6.

The shaping gantry 40 includes two cutter assemblies 44 and 46 mounted on rails 48 and 50 (FIGS. 2a–2f). Each cutter assembly 44 and 46 includes a block 44a, 46a having a cutter mounting extension 44b, 46b. The blocks 44a, 46a have rollers 44c, 46c which permit reciprocal movement of their corresponding blocks along the rails 48 and 50. A cutter 44d and a cutter 46d are swivably mounted in their respective cutter extensions.

Figure 2F:
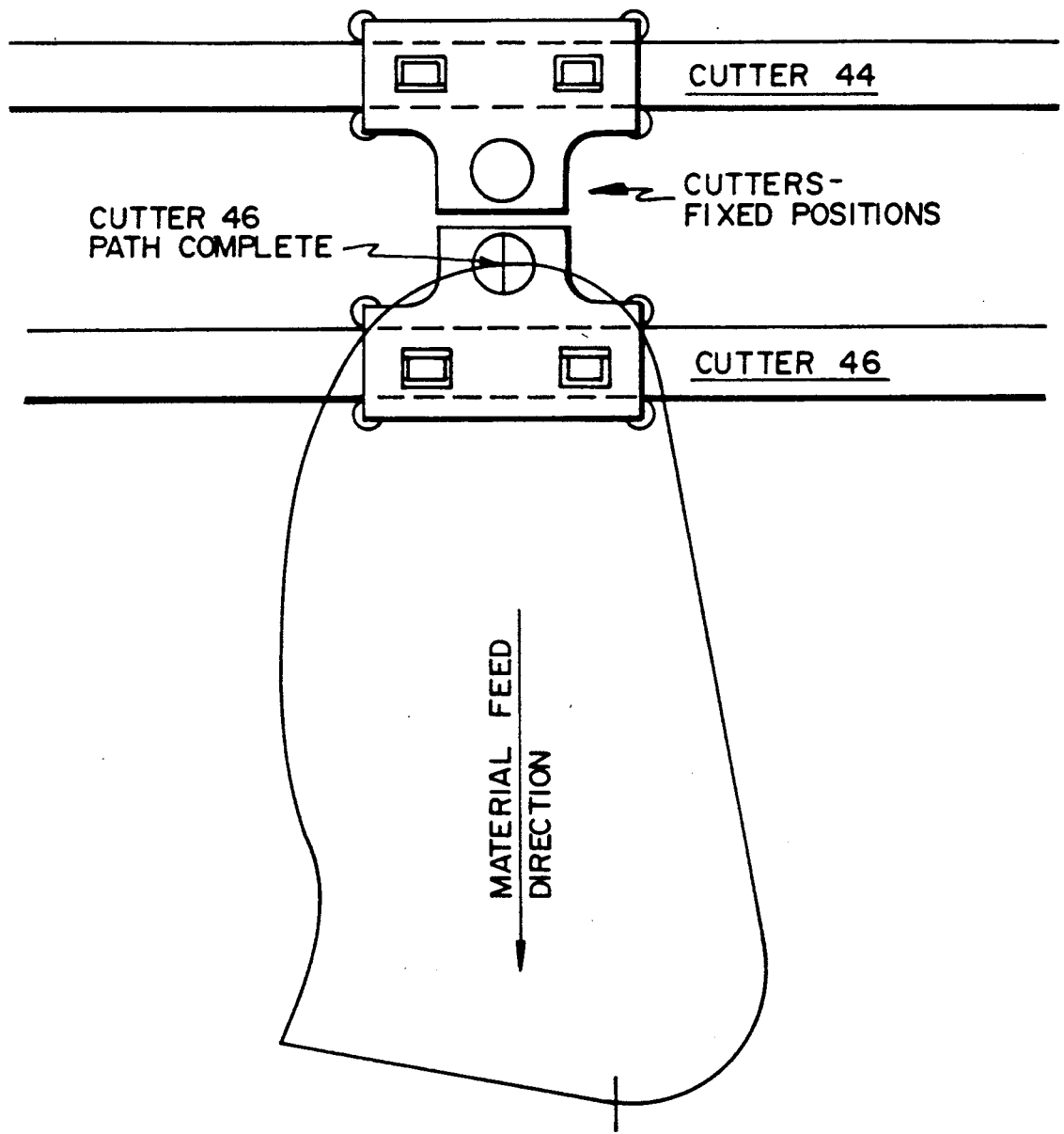

With the cutter assemblies 44 and 46 any shape can be cut for a given ply. A cutting cycle is shown from start (FIG. 2a) to completion (FIG. 2f). The corresponding movement of the cutter assemblies is shown in these figures. The cutters 44d and 46d swivel as their corresponding blocks reciprocate along their respective rail. In addition, the gantry as a whole, or the preimpregnated composite material 52 drawn from a roll 22 and fastened to the belt 34 by vacuum from the vacuum chamber in the platform 36, can move longitudinally, i.e., in the longitudinal direction of the belt 34.

Figure 3:
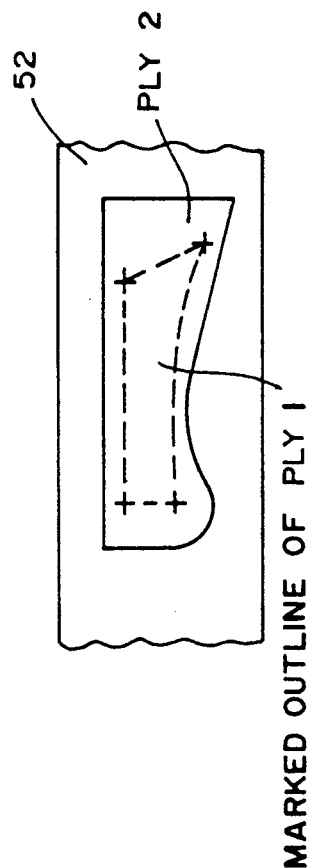
FIG. 3, which is a schematic plan view illustrating a ply and the marked outline of the preceding cut ply.

The marking gantry 42 includes an ink jet marker 54 which is displaceably mounted to move transversely to the longitudinal direction of the belt 34. The jet marker 54 applies a final assembly ply number and the location of the next ply, as shown in FIG. 3. Preferably, the marking is effected first followed by shaping.

Figure 4:
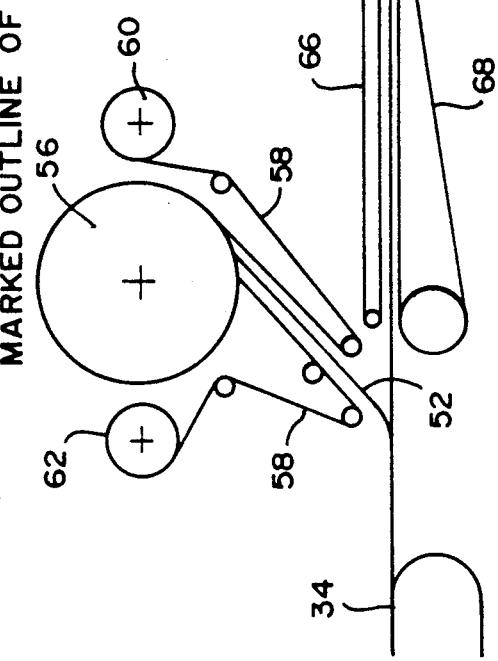
FIG. 4, which is a schematic view in elevation of the backing removal station of the system of FIG. 1.

The scrap removal station 16 includes, as shown in FIG. 4, a take-up reel 56 onto which the remaining portion of the material 52 absent the cut and shaped plies is taken up between plastic film strips 58 supplied by supply reels 60 and 62 onto the take-up reel 56 for future use or disposal. The shaped plies continue to move toward the storing station 18. For this movement, a transport belt drive system 64 including upper belt 66 and lower belt 68 is provided. The transport belt drive system 64 is situated relative to the location of the upwardly directed material 52 so that the plies are transferred from the belt 34 to the transport belt drive system 64 effectively.

Figure 5:
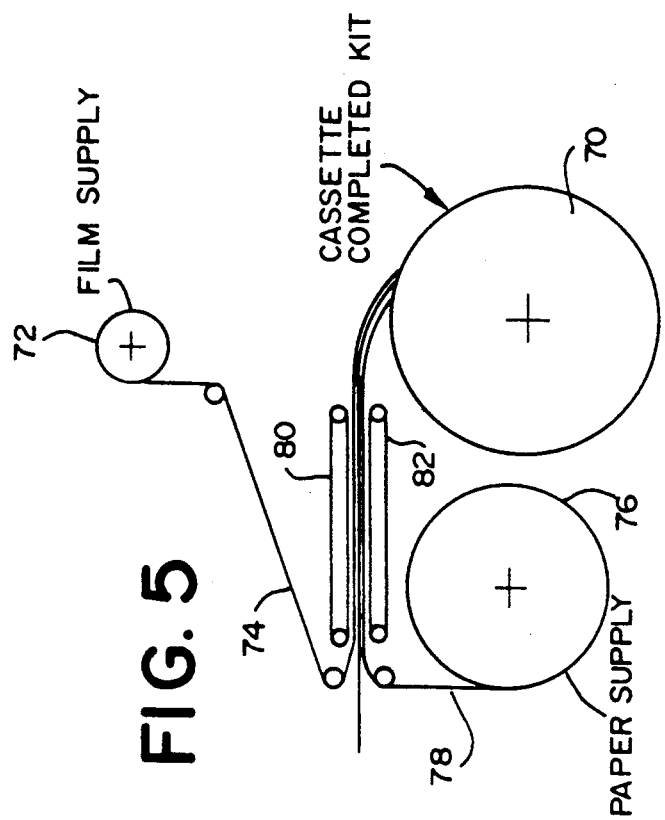
FIG. 5, which is a schematic view in elevation of the scrap sandwiching and removal station of the system of FIG. 1.

The storing station 18 includes, as shown in FIG. 5, a storage cylinder or cassette 70, a film supply reel 72 for supplying a plastic film 74, a paper supply reel 76 for supplying paper 78 and a transport belt system including upper belt 80 and lower belt 82. The shaped plies are received from the transport belt drive system 64 between belts 80 and 82 where they are sandwiched between paper 78 and film 74 and taken up into the cassette 70.

Considering the example noted above, the operation of kitting a layup with ten plies is as follows:

1. index the chamber 20 to the bias-ply roll of preimpregnated composite material and dispense enough material onto the belt 34 to form ply 1. Cut off the bias-ply material;

2. index the chamber 20 to the uni roll of preimpregnated composite material and dispense enough material onto the belt 34 to form plies 2 and 3. Cut off the uni material;

3. index the chamber 20 to the woven roll of preimpregnated composite material and dispense enough material onto the belt 34 to form plies 4 and 5. Cut off the woven material;

4. index the chamber 20 back to the bias-ply roll, and so on;

5. move the conveyor belt 34 so that each type material is situated end-to-end and fastened by the vacuum at the working station;

6. move the ink jet printer longitudinally on the rails 38 and mark each type of material at an appropriate location with the ply number and the outline of the immediately preceding cut ply, i.e., ply 2 has the outline of ply 1 marked thereon. Of course, if each ply has an identical shape and size, then the outline is not necessary;

7. move the shaping gantry 40 longitudinally on the rails 38 so that the cutter assemblies 44 and 46 cut the marked material to form the individual plies; and 8. unload the belt 34, with the plies delivered to the cassette 70 with ply 1 entering first, and the remaining unused material disposed of as noted above.

The first ply to be withdrawn from the cassette 70 and placed on or in the forming tool is ply 10.

With the above sequence, any number of layups can be made much more quickly and efficiently with less scrap generated than is presently possible, and with costs considerably reduced.

Figure 6:
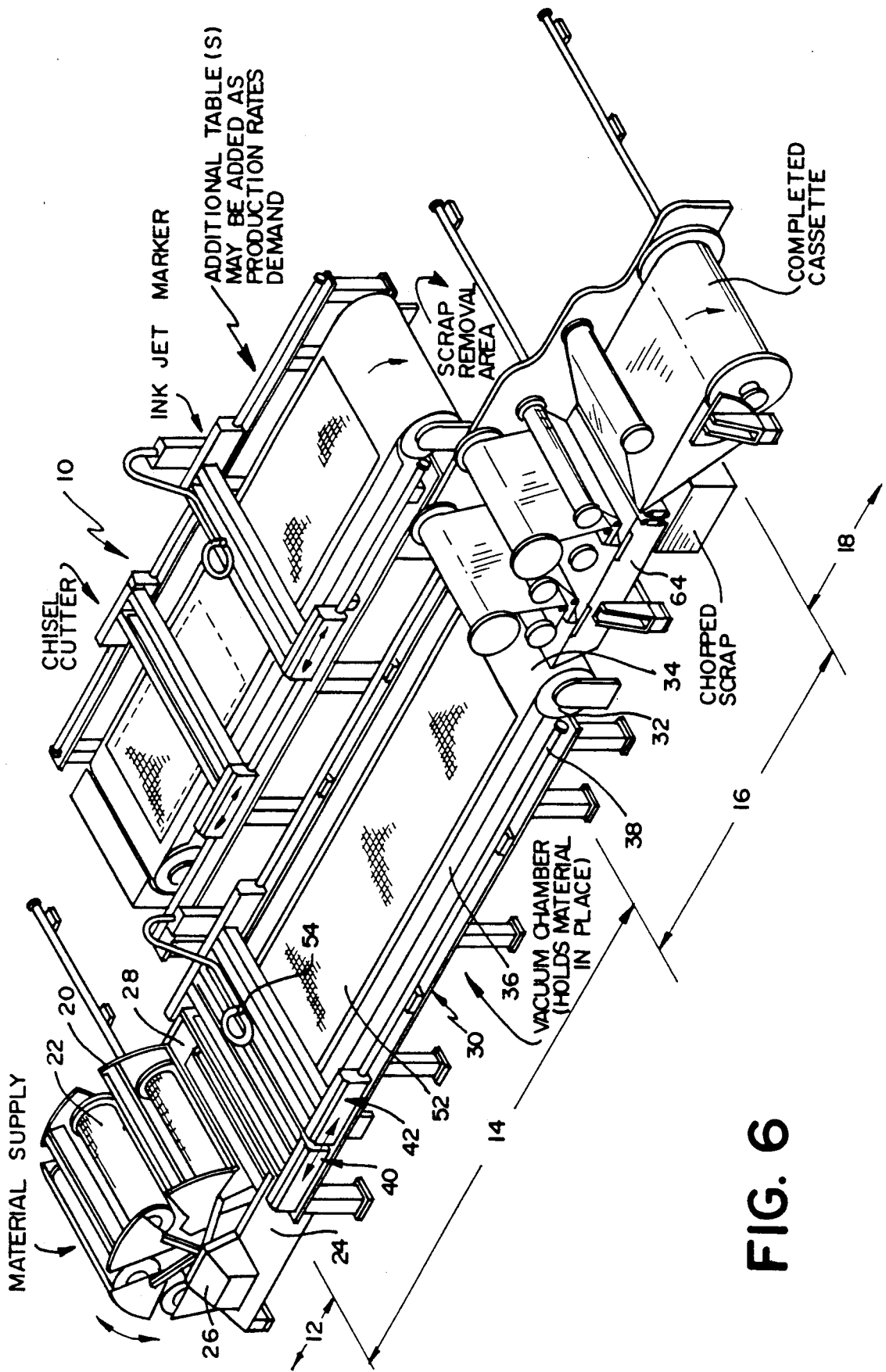
FIG. 6, which is an alternate embodiment to that shown in FIG. 1 including a plurality of working stations.

An alternative embodiment shown in FIG. 6 can be used to expand the productivity of the layup process. Two or more work stations 14 are contemplated with a single supply station 12, scrap station 16 and storing station 18. The supply station is mounted on rails 84, while the scrap station 16 and storing station 18 are mounted on rails 86 for movement between working stations. With such an embodiment, the capacity of the system to produce layups of preimpregnated composite material is further increased.

What is claimed is:

1. An automated cutting and kitting system for at least two types of preimpregnated composite material, comprising:

preimpregnated composite material supply means containing a supply of each type of preimpregnated composite material;

means for indexing said supply means for presenting a selected type of preimpregnated composite material for cutting;

means for cutting a selected type of preimpregnated composite material presented from said supply means to form a series of cut plies;

means for sequentially shaping each cut ply by cutting each said ply in accordance with a preselected outline; and means for kitting each shaped ply by storing each shaped ply for subsequent use in a layup in accordance with its position in the layup.

2. The automated cutting and kitting system as defined in claim 1, further comprising:

means for marking each cut ply with the outline of the immediately preceding cut ply.

3. The automated cutting and kitting system as defined in claim 1, wherein said means for kitting comprises a cylindrical container which is detachable from said system.

4. The automated cutting and kitting system as defined in claim 1, further comprising:

conveyor means situated between said cutting means and said kitting means for receiving said plies and conveying said plies in the order in which they are cut.

5. The automated cutting and kitting system as defined in claim 4, wherein said conveyor means includes vacuum means for retaining said cut plies in order on said conveyor means.

6. The automated cutting and kitting system as defined in claim 4, wherein said means for cutting and said means for shaping are both mounted to said conveyor means.

7. The automated cutting and kitting system as defined in claim 6, wherein said means for shaping includes a pair of cutters mounted to move in synchronism transversely to the direction of movement of said conveyor means.

8. The automated cutting and kitting system as defined in claim 1, further comprising:

a plurality of conveyor means situated between said cutting means and said means for kitting for receiving said plies and conveying said plies in the order in which they are cut;

means for displacing said preimpregnated composite material supply means together with said means for indexing between said plurality of conveyor means; and means for displacing said means for kitting each shaped ply between said plurality of conveyor means.

9. The automated cutting and kitting system as defined in claim 6, wherein each conveyor means includes vacuum means for retaining said cut plies in order on said conveyor means.

10. The automated cutting and kitting system as defined in claim 8, wherein each conveyor means includes means for cutting and means for shaping mounted thereon.

11. The automated cutting and kitting system as defined in claim 10, wherein each said means for shaping includes a pair of cutters mounted to move in synchronism transversely to the direction of movement of their respective conveyor means.

12. A method of cutting and kitting a layup of a plurality of plies of at least two types of preimpregnated composite material, comprising the steps of:

aligning each ply of a given type of preimpregnated composite material in the order in which it is to be positioned in the layup;

sequentially cutting each ply in accordance with a predetermined shape; and kitting the cut plies by storing the cut plies such that the top ply of the layup is stored first.

13. The method of cutting and kitting as defined in claim 12, further comprising the step of:

marking the predetermined shape of a ply onto the immediately subsequent cut ply in said alignment.

* * * * *